July 2, 1929.  A. R. PULVER  1,719,519
ASH REMOVER FOR PRODUCER GAS GENERATORS
Filed April 17, 1928
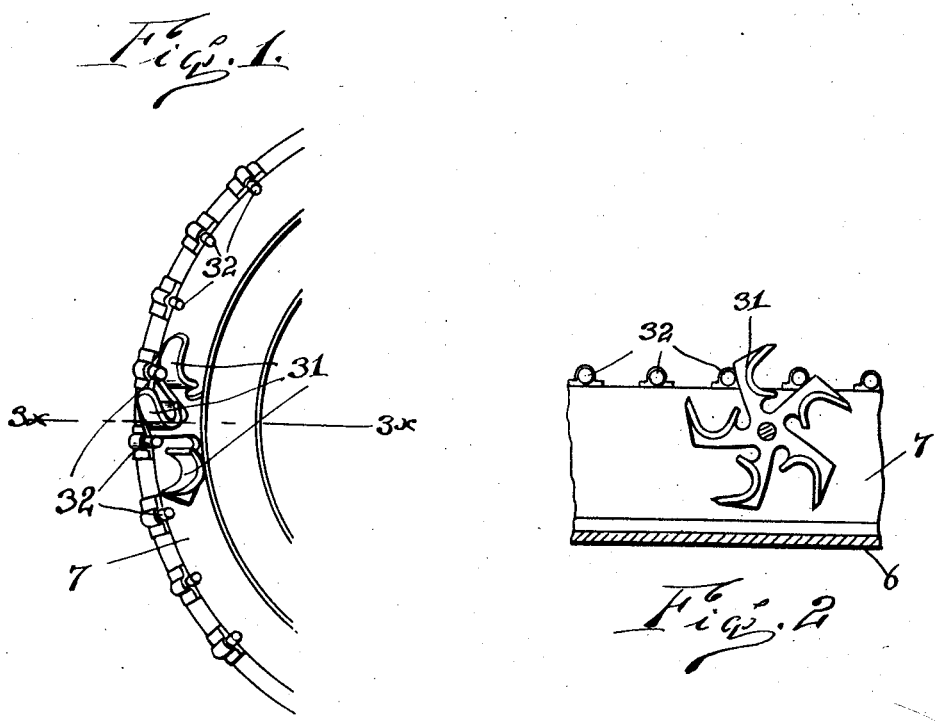
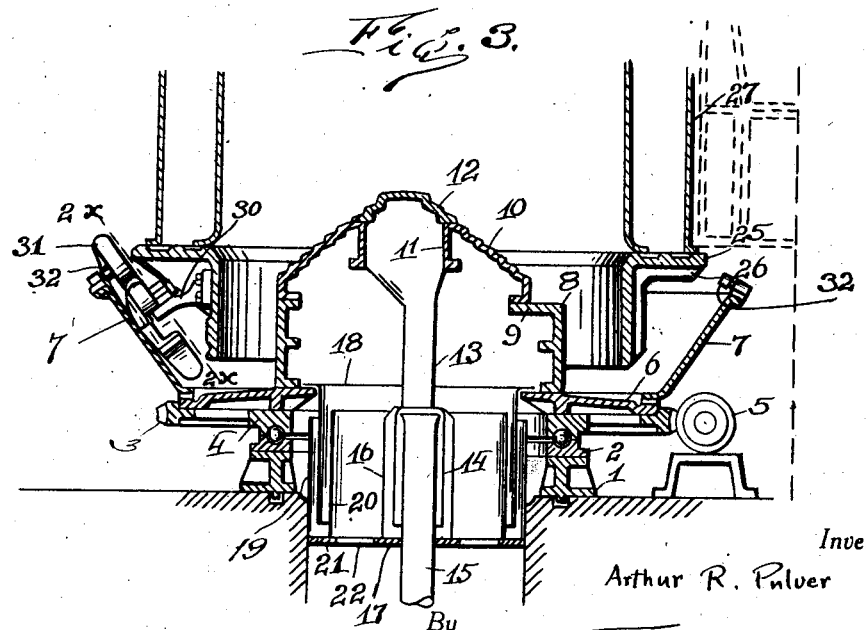
Inventor
Arthur R. Pulver
By Frank Keizer
Attorney

Patented July 2, 1929.

1,719,519

UNITED STATES PATENT OFFICE.

ARTHUR R. PULVER, OF ADAMS BASIN, NEW YORK.

ASH REMOVER FOR PRODUCER GAS GENERATORS.

Application filed April 17, 1928. Serial No. 270,710.

The object of this invention is to provide a new improved device for removing the ashes from the pan of a producer gas generator.

This and other objects of the invention will be fully illustrated in the drawings, described in the specification and pointed out in the claims at the end thereof.

In the drawings:

Figure 1 is a top plan view of the ash receptacle of the generator, the water jacket being broken away and shown partly in section.

Figure 2 is a section on the line $2^x$—$2^x$ of Figure 3.

Figure 3 is a vertical transverse section on the line $3^x$—$3^x$ of Figure 1.

In the drawings like reference numerals indicate like parts.

In the drawings reference numeral 1 indicates a stationary annular base. 2 indicates a ball race on the top thereof and 3 indicates a worm gear having a ball race 4 constituting the inner part thereof, which worm gear is driven by an electric motor 5. On top of the gear 3 is placed the annular plate 6, on top of which rests the ash pan 7 which is annular in shape, the inner rim of which rests on the outer edge of the plate 6 and of which the plate 6 forms partially a bottom. Located centrally on the plate 6 is provided a cylindrically shaped shell 8 having an eccentric flange 9 on the top thereof. Resting on this flange is the cone shaped grate 10 having a hub 11 extending downward from an opening in the top thereof. On top of the grate 10 is placed the cap 12 which covers the opening of the hub 11. From the hub 11 extends downward a pipe 13, which pipe at the lower end is expanded into the pipe 14. The pipe 14 rotates with the pipe 13, it being understood that the gear 3, ash pan 7, shell 8 and grates 10 and 12 all rotate together.

The pipe 14 rotates between the fixed pipe 15 and the cylinder 16. The pipe 15 and the cylinder 16 make a tight joint with the bottom 17 and the annular space enclosed thereby is filled with water in which the pipe 14 is sufficiently immersed to form a seal therewith so that the air that is forced up through the pipe 15 cannot escape but will flow up through the pipe 13 and out through the grate 12.

The inner rim of the annular plate 6 supports a cylindrical shell 18 having an outwardly extended flange thereon, which flange rests on the plate 6. This shell extends down into an annular tank formed by the shells 19 and 20 and the bottom 21. This tank is filled with water and the shell 18 is sufficiently immersed therein to form a seal therewith so that the air that flows up through the openings 22, 22 cannot escape but must pass out through the grate 10, which is a casting provided with suitable openings to let the air pass through.

Rigidly supported above the ash pan and independent thereof and held against rotation is the seal skirt 25 which is a casting made in several segments which are bolted together into a complete ring. Flanges 26 are provided on the segments for the purpose of joining them together by passing bolts through the flanges. On top of the seal skirt is provided the water jacket 27 with which the fire is surrounded.

In the normal operation of the generator the grates 10 and 12 are covered with ashes so that the fuel does not come into contact with them. The ashes also fill the pan 7. The fuel used is coke screenings, the largest pieces being of small size. The ashes support the fire so that it never comes in contact with the grates. The grate 10 is eccentric so that as it rotates it stirs the ashes and causes them to move down into the pan and the ashes in the pan rotate with the pan.

The plate 6 makes a tight joint with the pan 7 and the shell 8 and these parts form a rotating receptacle which is filled with water and ashes and into which the stationary sealed skirt 25 projects as the receptacle rotates. The water seals the receptacle and prevents gas from leaking out through the ashes.

On one side of the seal skirt 25 I provide a bracket 30 on which is mounted to rotate an ash impeller 31, which has for its object to lift the ashes from the pan 7 as the pan 7 moves past the impeller. The impeller is a wheel or spider having five spokes therein and has no rim thereon. Each of the spokes is cup shaped on the front thereof and is smooth on the back thereof. On the pan 7 at regular intervals are mounted rollers 32 which engage the straight back of each of the spokes of the spider and cause the spider to rotate as the pan rotates. The pan 7 rotates very slowly, taking an hour or more to make a complete rotation, and in each rotation of the pan the ash impeller will rotate several times.

Each spoke carries up a cup full of ashes and drops over the side of the pan a portion of its load as it passes over the vertical center, the ashes dropping outside the pan. In this way the ashes are removed from the pan.

I claim:

1. A rotating ash pan having a vertical axis, a fixed support above the pan, an ash impeller mounted to rotate on said fixed support, said impeller being located in the pan but being independent thereof and having a plurality of spokes thereon, said spokes being cup shaped on the upper side and being adapted to lift ashes out of the pan, pins on said pan adapted to engage said spokes on the underside and rotate the impeller as the pan rotates.

2. A rotating ash pan having a vertical axis, a fixed support above the pan, an ash impeller mounted to rotate on said fixed support, said impeller being located in the pan but being independent thereof and having a plurality of spokes thereon, said spokes being cup shaped on the upper side and being adapted to lift ashes out of the pan, means for rotating said impeller to lift ashes out of the pan as the pan rotates to bring ashes to the impeller.

3. A rotating ash pan having a vertical axis, a fixed support above the pan, an ash impeller mounted to rotate on said fixed support, said impeller being located in the pan but being independent thereof and having a plurality of spokes thereon, said spokes being cup shaped on the upper side and being adapted to lift ashes out of the pan, means for rotating said impeller to lift ashes out of the pan as the pan rotates to bring ashes to the impeller, said impeller and its axis being inclined, the upper part of the impeller overhanging the outer edge of the pan.

In testimony whereof I affix my signature.

ARTHUR R. PULVER.